United States Patent [19]

Büngeler

[11] Patent Number: 5,481,459
[45] Date of Patent: Jan. 2, 1996

[54] CONTROL SYSTEM FOR AN ACTIVE SUSPENSION SYSTEM IN A MOTOR VEHICLE AND METHOD FOR CONTROLLING MOTOR VEHICLE HANDLING AROUND CURVES

[75] Inventor: Jörg Büngeler, Rheinberg, Germany

[73] Assignee: Fichtel & Sachs AG, Schweinfurt, Germany

[21] Appl. No.: 331,894

[22] Filed: Oct. 31, 1994

[30] Foreign Application Priority Data

Nov. 5, 1993 [DE] Germany .................. 43 37 772.6

[51] Int. Cl.$^6$ ........................... B60G 17/00
[52] U.S. Cl. ............. 364/424.05; 280/707; 280/840
[58] Field of Search ............... 364/424.05, 426.02, 364/426.03, 426.04, 492, 565, 570, 571.01; 280/772, 688, 707, 714, 840; 180/170, 197, 143; 324/160, 161, 162

[56] References Cited

U.S. PATENT DOCUMENTS

| | | | |
|---|---|---|---|
| 4,616,848 | 10/1986 | Sugasawa et al. | 280/707 |
| 4,669,749 | 6/1987 | Tanaka et al. | 280/707 |
| 4,673,194 | 6/1987 | Sugasawa et al. | 280/707 |
| 4,761,022 | 8/1988 | Ohashi et al. | 280/703 |
| 4,989,148 | 1/1991 | Gürke et al. | 364/424.05 |
| 5,276,621 | 1/1994 | Henry et al. | 364/424.05 |
| 5,322,319 | 6/1994 | Tanaka et al. | 280/689 |

FOREIGN PATENT DOCUMENTS

| | | |
|---|---|---|
| 0236947 | 9/1987 | European Pat. Off. . |
| 0427909 | 5/1991 | European Pat. Off. . |
| 3936987 | 5/1991 | Germany . |
| 4003493 | 8/1991 | Germany . |
| 2232939 | 1/1991 | United Kingdom . |
| 8900927 | 2/1989 | WIPO . |

Primary Examiner—Kevin J. Teska
Assistant Examiner—Tan Q. Nguyen
Attorney, Agent, or Firm—Nils H. Ljungman & Associates

[57] ABSTRACT

An active hydraulic system for a motor vehicle, which active hydraulic system comprises a supply pump, a number of valves to control the actuators, and a measuring device to determine the movement parameters of the vehicle. The components of the active hydraulic system follow a process for the recognition of cornering for a vehicle. To achieve this, the components of the active hydraulic system measure signals and accordingly adjust and alter the ride of the vehicle. The process includes measuring a vehicle acceleration signal a and comparing the vehicle acceleration signal a to an acceleration threshold value $a_s$. A vehicle velocity signal v is then compared to a lower vehicle velocity threshold value $v_u$. The process further includes comparing the vehicle velocity signal v to an upper vehicle velocity threshold value $v_o$. A steering movement which is measured as a value of $s_{delta}$, is detected as a steering angle below and above a steering angle threshold value $s_{delta}$. When the velocity of the vehicle is between the lower and upper vehicle velocity threshold values $v_u$ and $v_o$, respectively, the power supply of the actuators is then actuated only if the actual acceleration simultaneously increases above the acceleration threshold value $a_s$.

15 Claims, 7 Drawing Sheets

CONTROL SYSTEM FOR AN ACTIVE SUSPENSION SYSTEM IN A MOTOR VEHICLE AND METHOD FOR CONTROLLING MOTOR VEHICLE HANDLING AROUND CURVES

BACKGROUND OF THE INVENTION

1. Field of the Invention

The invention relates to an active vehicle suspension with cornering.

2. Background Information

With active vehicle hydraulic systems, such as active suspension or anti-roll systems, there is a problem of reducing the generation of energy. The amount of time and energy expended in computing must likewise be reduced. The prior art discloses that the lateral acceleration of a vehicle can be calculated from the steering angle and the vehicle velocity so that the pump or the flow valve of an active hydraulic system can be switched accordingly. But with this process, an inclined road surface, ice or the influence of tire size or tire pressure can introduce an error in the lateral acceleration signal. The calculation process also requires a significant amount of time, which reduces the reaction time of the system as a whole.

Alternatively, a lateral acceleration sensor can be used for the lateral acceleration signal. With an uneven or inclined road surface, significant signal errors occur here as well, which can be compensated for by raising the threshold value for activating the pump or changing the switching position of the flow valve element(s), with the consequence that a relatively broad range of lateral acceleration remains excluded from the control operation.

OBJECT OF THE INVENTION

The object of the current invention is to eliminate the disadvantages of the prior art as simply and inexpensively as possible, thus achieving a reliable and uncomplicated process.

SUMMARY OF THE INVENTION

The current invention teaches that this object can be achieved by the means discussed below.

In one embodiment of the invention no computer capacity is required for the power supply to the actuators. Consequently, velocity threshold value $v_u$ takes parking maneuvers into the system can react very quickly. The use of a lower vehicle consideration. The upper vehicle velocity threshold value $v_o$ serves as a limit value for an AND relation to the vehicle acceleration, thus ensuring recognition of cornering.

For a velocity range with a vehicle velocity signal v greater than $v_o$, the actuators are supplied as a function of the vehicle acceleration signal a without consideration of the steering angle threshold value. At velocities above $v_o$, acceleration signals occur even at very slight steering angles, making possible an accurate recognition of cornering. These steering angles are generally smaller than the threshold angle. Consequently, the AND relation between the steering angle threshold value and the vehicle acceleration signal valid up to velocity threshold value $v_o$ is thereby defined so that the this velocity range must be dissolved. The upper vehicle acceleration angle is sufficient as a parameter.

To stabilize the process, the invention teaches that when the power supply to the actuators is actuated, current values must drop below a vehicle acceleration threshold value $a_h$ which is smaller than the vehicle acceleration threshold value $a_s$ to turn off the power supply to the actuators when the previous vehicle speed signal v is above $v_o$. The same is true for an instantaneous vehicle velocity signal v between $v_u$ and $v_o$, at which actual values must drop below both the steering angle threshold value and the vehicle acceleration threshold value $a_h$, which is smaller than the vehicle acceleration threshold value $a_s$. With an instantaneous vehicle velocity signal v below $v_u$, actual values must drop below the vehicle acceleration threshold value a, the steering angle threshold value and also a lower vehicle acceleration threshold value $v_{ua}$, which is smaller than the vehicle acceleration value $v_a$. The threshold values used to deactivate the power supply result in a sort of hysteresis, which represents an additional safety potential.

The apparatus for the recognition of cornering for a vehicle with an active hydraulic system to adjust components to alter the ride of the vehicle consists of a supply pump for the hydraulic system, a number of valves for control of the actuators and a measuring device for determination of vehicle movement parameters, whereby the measuring device consists of at least one sensor which measures vehicle acceleration and one which measures the vehicle velocity. A steering angle sensor detects when the steering angle threshold value is exceeded. The threshold values are stored in a memory unit. The steering angle switch, which functions in a manner which is similar to the resetting of a turn signal lever, eliminates the need for a steering angle sensor, which is structurally more complex and thus also more expensive.

In an embodiment of the invention, preferably no computer capacity is required for the power supply to the actuators. Consequently, the system can preferably react very quickly. The use of a lower vehicle velocity threshold value $v_u$ preferably takes parking maneuvers into consideration. The upper vehicle velocity threshold value $v_o$ preferably serves as a limit value for an AND relation to the vehicle acceleration, thus preferably ensuring recognition of cornering. That is to say, when the velocity is sufficiently high the acceleration is preferably always considered during cornering.

For a velocity range with a vehicle velocity signal v greater than $v_o$, the actuators are preferably supplied as a function of the vehicle acceleration signal a, preferably without consideration of the steering angle threshold value. At velocities above $v_o$, acceleration signals preferably occur even at very slight steering angles, preferably making possible an accurate recognition of cornering. These steering angles are preferably generally smaller than the threshold angle. Consequently, the AND relation between the steering angle threshold value and the vehicle acceleration signal preferably valid up to this velocity range preferably must be dissolved. That is to say, the AND relationship is terminated after the velocity has reached a high enough value. The upper vehicle velocity threshold value $v_o$ is thereby preferably defined so that the vehicle acceleration angle is preferably sufficient as a parameter.

To stabilize the process, an embodiment of the invention teaches preferably that when the power supply, that is, the pumps and/or the valves, to the actuators is actuated, current values must preferably drop below a vehicle acceleration threshold value $a_h$ which is preferably smaller than the vehicle acceleration threshold value $a_s$ to preferably turn off the power supply to the actuators when the previous vehicle speed signal v is above $v_o$. The same is preferably true for an instantaneous vehicle velocity signal v between $v_u$ and $v_o$, at which actual values must preferably drop below both the steering angle threshold value and the vehicle acceleration threshold value $a_h$, which is preferably smaller than the vehicle acceleration threshold value $a_s$. With an instantaneous vehicle velocity signal v below $v_u$, simultaneously actual values must preferably drop below: the vehicle acceleration threshold value $a_h$, the steering angle threshold value and also a lower vehicle acceleration threshold value $a_{ua}$, which lower vehicle acceleration threshold value $a_{ua}$ is preferably smaller than the vehicle acceleration value $a_u$. The threshold values used to deactivate the power supply result in a sort of hysteresis, which represents an additional safety potential. This hysteresis preferably prevents hunting between the various ranges of values so that a rapid switching back and forth is avoided.

The apparatus for the recognition of cornering for a vehicle with an active hydraulic system to adjust components to alter the ride of the vehicle consists of preferably a supply pump for the hydraulic system, a number of valves preferably for control of the actuators and a measuring device preferably for determination of vehicle movement parameters, whereby the measuring device preferably consists of at least one sensor which measures vehicle acceleration and one which measures the vehicle velocity. A steering angle sensor detects when the steering angle threshold value is preferably exceeded. The threshold values are preferably stored in a memory unit. The steering angle switch, which preferably functions in a manner which is similar to the resetting of a turn signal lever, preferably eliminates the need in an at least one embodiment for a steering angle sensor, which is structurally more complex and thus also more expensive.

BRIEF DESCRIPTION OF THE DRAWINGS

The invention is described below with reference to the accompanying drawings.

DESCRIPTION OF THE PREFERRED EMBODIMENT

Figure 1:
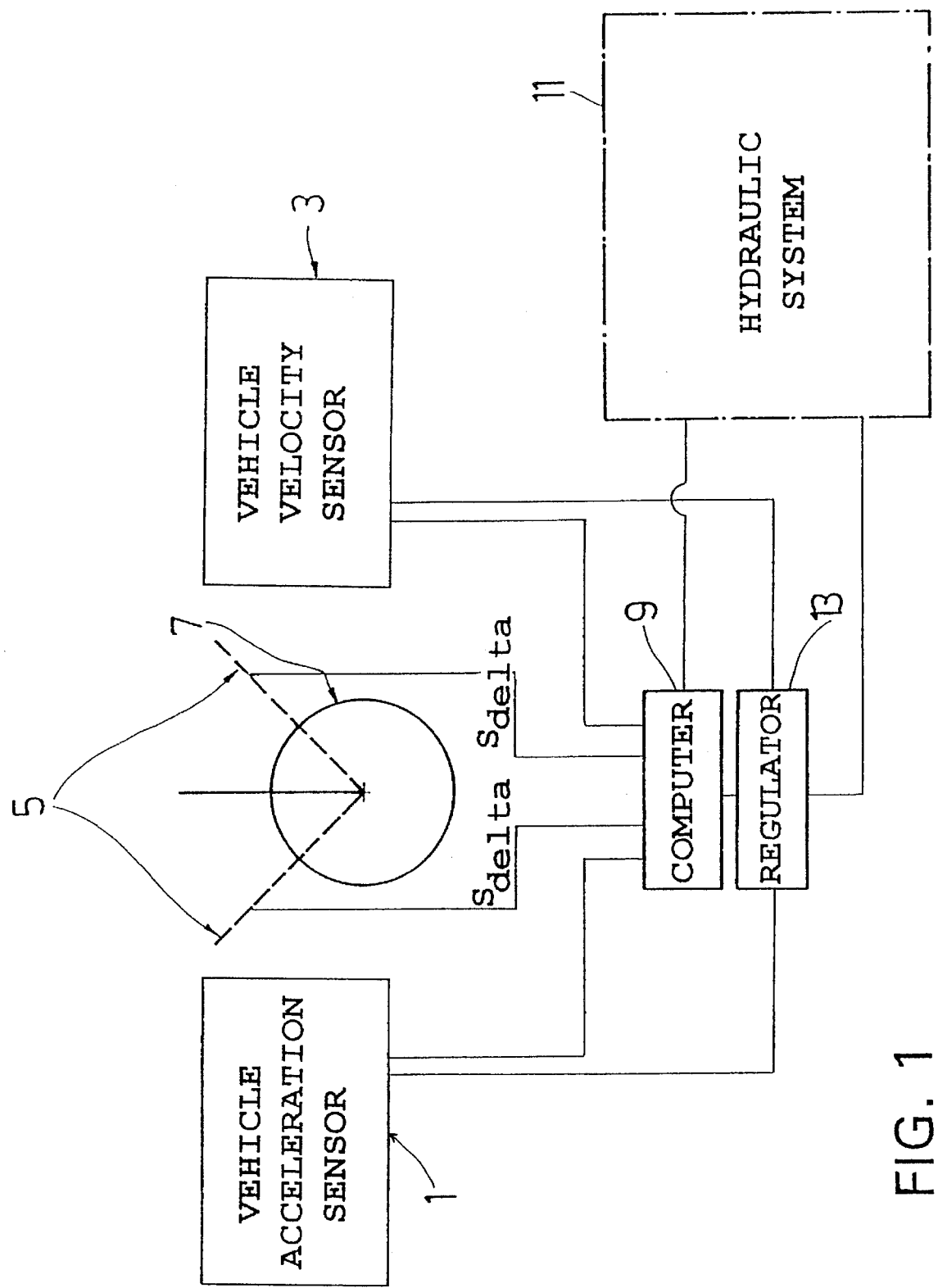
FIG. 1 shows a schematic diagram of a process system for the recognition of cornering.

FIG. 1 is a schematic diagram of a process as claimed by the invention and consists of, among other things, at least one vehicle acceleration sensor 1 and a vehicle velocity sensor 3, such as a speedometer. To detect cornering, a steering angle switch 5 is also used, which sends a signal $s_{delta}$ to a computer 9 whenever the angle of the steering wheel 7 exceeds a defined steering wheel angle. On the basis of the signal $s_{delta}$, the absolute steering angle cannot be determined, but the steering angle direction can, which is then used to control the hydraulic system. The computer 9 stores an algorithm, which is illustrated by means of the two tables, separated into a table for the "on" function and a table for the "off" function of a hydraulic system 11 or the actuators of a hydraulic system 11.

| Velocity v | Acceleration α | Steering Angle on 1/off 0 | Power Supply on 1/off 0 |
|---|---|---|---|
| $v < v_u$ | $a < a_s$ $a > a_s\pm$ | 0/1 | 0 |
| $v_u < V < v_o$ | $a > a_s$ | 1 | 1 |
| $v > v_o$ | $a > a_s$ | 0/1 | 1 OFF |
| $v > v_o$ | $a < a_h$ | 0/1 | 0 |
| $v_{ua} < v < v_o$ | $a < a_h$ | 0 | 0 |
| $v_{ua} < v < v_o$ | $a < a_h$ | 1 | 1 |
| $v < v_{ua}$ | $a > a_h$ $a < a_h$ | 0/1 | 1 |

There is essentially an AND relation between the velocity signal v and the acceleration signal a and the steering angle signal $s_{delta}$.

Activation of the power supply independent of the vehicle acceleration a and the steering angle occurs only above a lower vehicle velocity threshold value $v_u$. The lower vehicle velocity threshold value $v_u$ is set to extremely slow vehicle operation, such as maneuvering a vehicle for parking, and is stored in memory 9. Above the vehicle velocity threshold value $v_u$ up to a velocity with an upper vehicle velocity threshold value $v_o$, the power supply is actuated only if there is both a steering angle signal and an acceleration a greater than the vehicle acceleration threshold value $a_s$. Above $v_o$, the power supply is actuated on the basis of a vehicle acceleration signal $a_s$, independent of a steering angle signal.

Assuming a vehicle velocity v above $v_o$, the hydraulic system 11 or the actuators are deactivated when the vehicle acceleration a is smaller than a vehicle acceleration threshold value $a_h$, which is smaller than the vehicle acceleration threshold value $a_s$. In this velocity range $v_u < v < v_o$, the actual values must drop below the steering angle threshold value and the vehicle acceleration threshold value $a_h$. A lower vehicle velocity threshold value $v_{ua}$ is used as the lower limit for deactivation, which is lower than the lower vehicle velocity threshold value $v_u$. The threshold values used to deactivate the system stabilize the process and simultaneously increase the margin of safety.

The hydraulic system 11 can be realized in a redundant fashion and can be used for a variety of suspension adjustments, such as spring settings or the horizontal stabilization of the vehicle, such as with an adjustable stabilizer. The intervention to feed the hydraulic system or the actuators can be accomplished in a number of ways. The supply pump can be uncoupled from the drive motor, or a pressure relief valve or a flow valve can also be connected so that the supply pump delivers an unpressurized flow into the supply reservoir of the hydraulic system. All the possible variants would advantageously reduce the energy use of the hydraulic system.

By way of example, a regulator 13 is shown which uses the signals from the measuring device 1 and 3 to adjust the actuators in the hydraulic system, whereby in other conceivable configurations, the computer 9 could send a signal to the regulator 13 so that the power supply would take place directly via the regulator 13.

Figure 2:
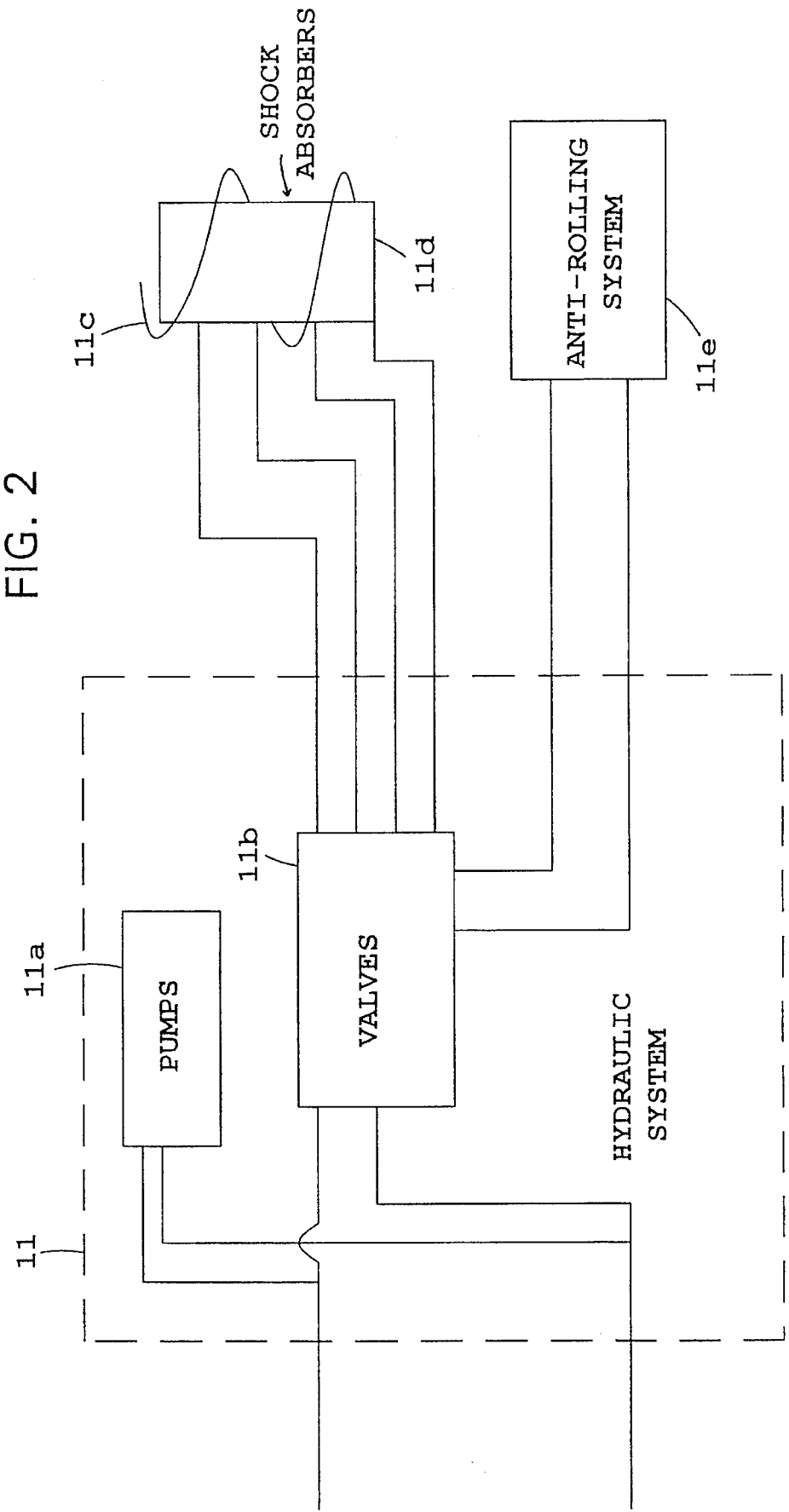
FIG. 2 shows a schematic diagram of a process system of FIG. 1.

FIG. 2 shows the hydraulic system 11 which contains pumps 11a, valves 11b, springs 11c, shock absorbers 11d, and the anti-rolling system 11e.

Figure 3:
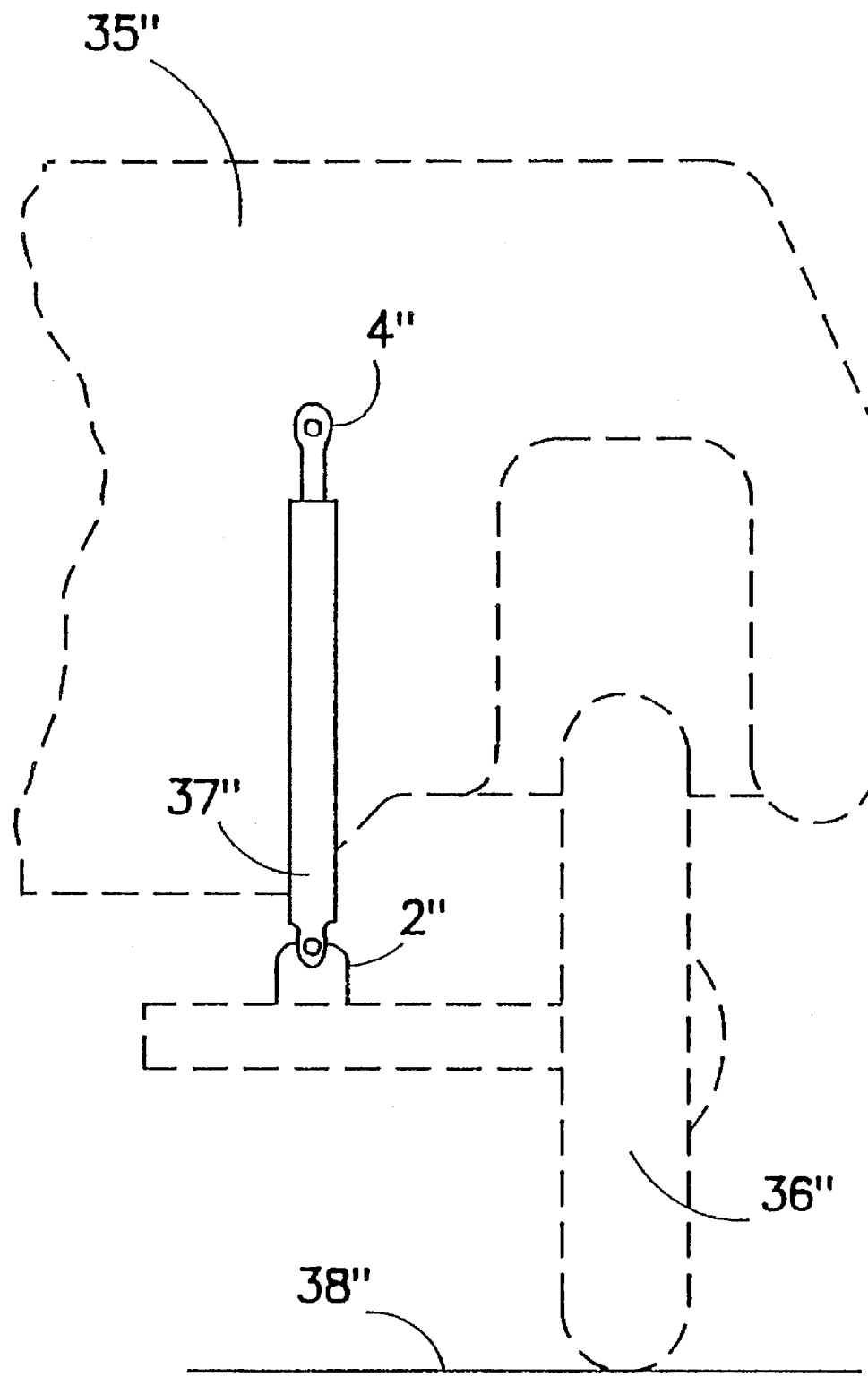
FIG. 3 schematically shows an illustrative practical application of a vibration damping apparatus in relation to a vehicle.

In FIG. 3, there is schematically shown an illustrative practical application of the vibration damping apparatus of the present invention in relation to a vehicle including a vehicle body 35" having a support wheel 36". The hydraulic vibration damping apparatus 37" is shown with the upper coupling member 4" fastened to move with the vehicle body 35" and the lower coupling member 2" fastened to move with the wheel 36". As the vehicle body 35" travels along a roadway 38", the support wheel 36" will move relative to the vehicle body 35" and the damping apparatus 37" will operate to damp undesired vibrations and relative movements between the vehicle body 35" and the support wheel 36" in response to sensed relative movement between the vehicle body 35" and the support wheel 36".

Figure 4:
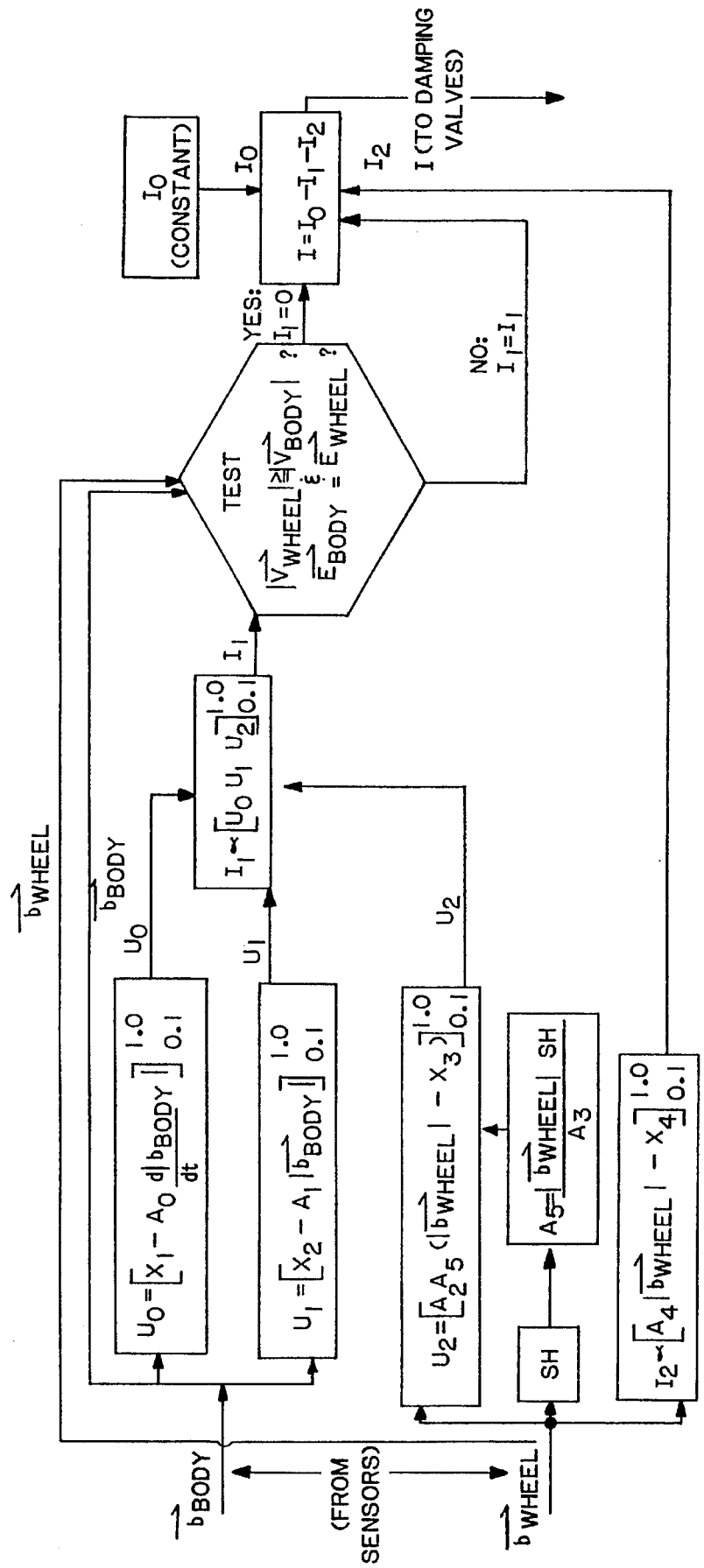
FIG. 4 is a schematic (or algorithmic) representation of a vibration damping apparatus in relation to a vehicle.

One situation in which the present invention may be used is discussed below. Referring to FIG. 4, signals indicative of the acceleration of the vehicle body $b_{body}$ and of the acceleration of the vehicle $b_{wheel}$ are utilized to derive therefrom signals indicative of damping force characteristics which are used to adjust vibration dampers included in a suspension system and are capable of exerting a variable damping force between the wheels and the body of a vehicle, to thereby substantially reduce the road shock transmitted to the body through the wheels.

Preferably, the sensor signals $b_{body}$ and $b_{wheel}$ are vector signals in the sense that they contain information indicative of not only the magnitude of acceleration of the respective vehicle part, but also the direction of such acceleration. For example, a positive signal could be used to indicate a vertically upward direction of acceleration, while a negative signal could be used to indicate a vertically downward direction of acceleration. Signals $b_{body}$ and $b_{wheel}$ might, for example, be generated by accelerometers, which are well known in the art and are described, for example, in U.S. Pat. No. 3,731,542, issued to Forsberg on May 8, 1973 and entitled "Optical Accelerometer" and U.S. Pat. No. 4,104,921, issued Aug. 8, 1978 to Nissl and entitled "Piezo Electric Acceleration Transducer", both patents of which hereby expressly incorporated by reference, with the same effect as if they were set forth in their entirety herein. An additional apparatus relating to variable vibration damping is disclosed in U.S. Pat. No. 4,638,670, issued on Jan. 27, 1987 to Moser and entitled "Apparatus for the Determination of the Distance Travelled by a Piston in a Cylinder", which is also hereby expressly incorporated by reference with the same effect as if the entire contents thereof were fully set forth herein.

It will be seen that, within the accompanying drawings, an arrow (i.e., "←") is sometimes employed to indicate a vector signal, i.e., a signal having both a magnitude and direction. Within the written portion of the specification, the use of a vector arrow has not been employed. However, the signals b, V and E should be understood to be vector signals, the magnitudes of these signals being indicated through the use of the absolute value symbol, e.g., "$|b_{body}|$".

As shown schematically in FIG. 4, the signal $b_{body}$ which is indicative of both the magnitude and the direction of acceleration of the vehicle body, is used to derive two intermediate signals $U_0$ and $U_1$, according to the transformations (e.g., formulas) 1) and 2) set forth below. It will be appreciated by those of ordinary skill in the art that the carrying out of these signal processing steps (or formulas) may be accomplished by various equivalent means, such as, for example, through the use of a microprocessor, a digital filter, or the like, in which case all of the signals discussed herein could be converted between analog and digital form through the use of analog to digital (A/D) and digital to analog (D/A) converters.

$$1.)\ U_0 = \left[ X_1 - A_0 \frac{d\ |b_{body}|}{dt} \right] \quad \begin{matrix} 1.0 \\ 0.1 \end{matrix}$$

$$2.)\ U_1 = [X_2 - A_1\ |b_{body}|] \quad \begin{matrix} 1.0 \\ 0.1, \end{matrix}$$

wherein $|b_{body}|$ equals the absolute value or (magnitude) of the acceleration of the vehicle body, $$\frac{d\ |b_{body}|}{dt}$$

equals the first derivative of the absolute value of the vehicle body acceleration with respect to time, and $A_0$, $A_1$, $X_1$ and $X_2$ are appropriately chosen constants based upon the particular vehicle characteristics (size, weight, etc.), empirical testing, expected road conditions, and the like.

Another intermediate signal $U_2$, and an intermediate current $I_2$, are determined using the absolute value of the wheel acceleration, $b_{wheel}$, according to the following signal processing transformations 3) and 4):

$$3.)\ U_2 = [A_2\ A_5\ (|b_{wheel}| - X_3)] \quad \begin{matrix} 1.0 \\ 0.1 \end{matrix}$$

$$4.)\ I_2\ a\ [A_4\ |b_{wheel}| - X_4] \quad \begin{matrix} 1.0 \\ 0.1 \end{matrix}$$

wherein $A_2$, $A_4$, $A_5$, $X_3$ and $X_4$ are once again appropriately determined constants.

The coefficient $A_5$ is determined according to the following formulation 5):

$$5.)\ A_5 = \frac{|b_{wheel}|SH}{A_3}$$

wherein the absolute value of $b_{wheel}$ SH is the absolute value of the wheel acceleration as determined by a sample and hold circuit, SH, and $A_3$ is, once again, an appropriately determined, substantially constant value.

Preferably, according to a well known sampling theorem, the sample and hold circuit, SH, is operated at a sampling frequency which is at least equal to or greater than twice the frequency of vibrations which design considerations determine should be taken into account, and are most preferably any known or expected resonance frequencies of the wheels. Additionally, the sample and hold circuit, SH, may include memory and comparator circuitry for determining and maintaining in memory the maximum wheel acceleration determined over an appropriate period of time.

Another intermediate current or signal $I_1$ is determined or produced in a proportional relationship to the product of the three intermediate signals $U_0$, $U_1$ and $U_2$ as follows:

$$6.)\ I_1\ a\ [U_0\ U_1\ U_2] \quad \begin{matrix} 1.0 \\ 0.1 \end{matrix}$$

In the above formulas (or transformations) 1–4 and 6, the intermediate signals $U_0$, $U_1$, $U_2$, $I_1$ and $I_2$ are all subjected to a limiting process such that their values, in a preferred embodiment, are limited to between about 0.1 and about 1.0. Of course, other appropriate limits might be utilized, depending upon the limits of adjustment of the particular vibration damping apparatus employed, etc.

It will be seen from FIG. 4 that the actual value of the variable damping control signal I, transmitted to the vibration damping apparatus, is preferably determined according to the following relationship:

$$I = I_0 - I_1 - I_2 \qquad 7.)$$

wherein $I_0$ is preferably a constant reference value, and wherein $I_1$ and $I_2$ preferably have values between 0.1 and 1.0 determined according to relationships 4) and 6) set forth above. Also, preferably, the variable damping control signal is limited so as to be allowed to range only between the limits of about 0 and about $I_{max}$. Most preferably, the damping control signal I is an electrical current used to set the damping characteristics of variable damping vibration isolation apparatuses (or shock absorbers), the damping characteristics of which can be current controlled. In an embodiment wherein all or part of the above-described signals are derived via numerical computation by a microprocessor or the like, preferably, the final control signal I will be converted by means well known in the art, to a current having a relatively corresponding value. However, it will be appreciated that any other signal, digital or analog, such as a voltage signal, a binary numerical representation, etc. may be derived which reflects the relationships set forth above.

As noted in relationship 7) set forth above, the final control signal I is, in part, derived by reducing the reference control signal $I_0$ by the intermediate signal $I_2$, as reflected in transformation 4). The reference control signal $I_0$ is preferably further reduced by the intermediate signal $I_1$ to derive the final control signal I. However, a test is first conducted to determine whether the reference signal $I_0$ is to be so further reduced by the intermediate signal $I_1$.

Figure 6:
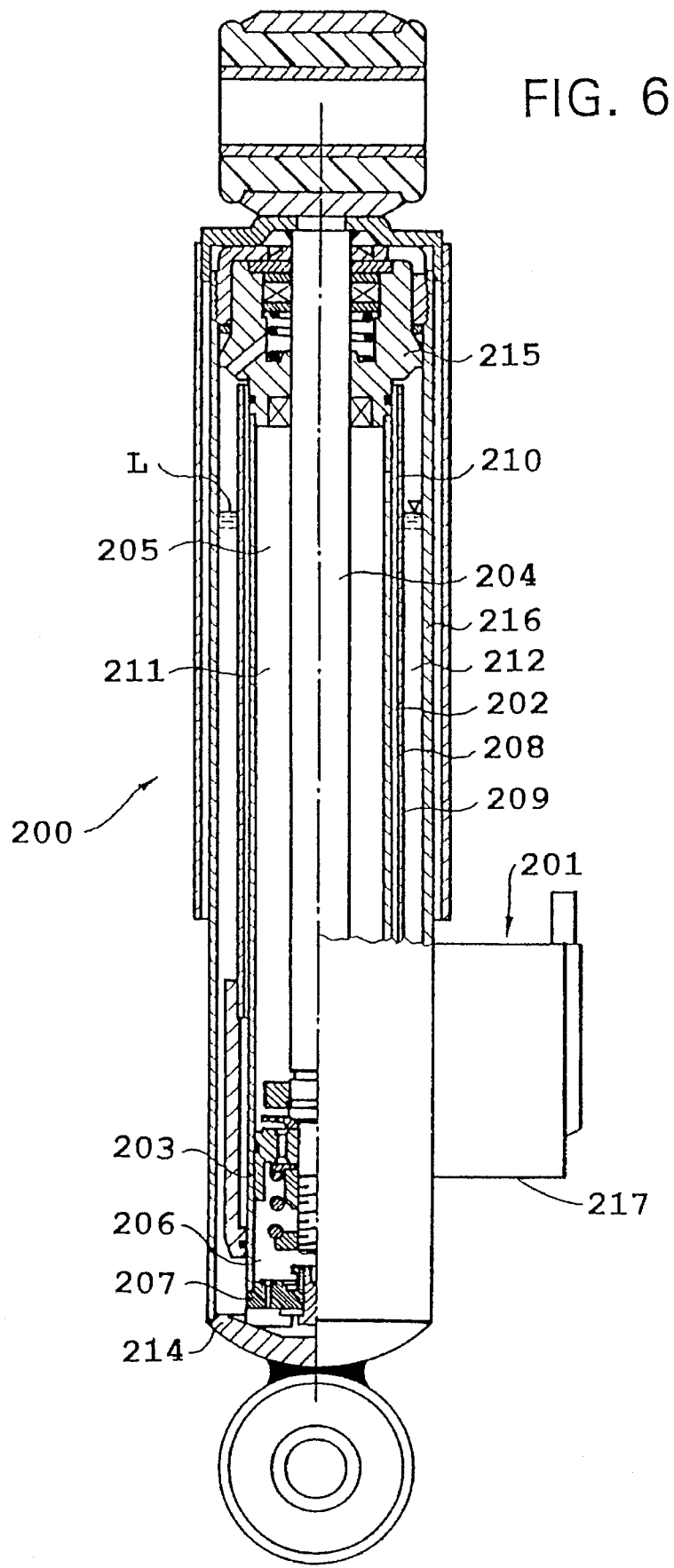
FIGS. 6 and 7 show a complete shock absorber assembly.

A further example of such a test circuit or algorithm is more fully set forth in FIG. 6. However, and still referring to FIG. 4, it will be seen that, in brief, the actual vector values indicating both the direction and magnitude of the wheel acceleration and of the body acceleration are employed in a test circuit (or algorithm), wherein the following two conditions 8) and 9) are checked:

$$|V_{wheel}| \geq |V_{body}|? \qquad 8.) \text{ and}$$

$$E_{body} = E_{wheel}? \qquad 9.)$$

Specifically, tests are conducted to determine a) whether the absolute value of the wheel velocity is equal to or exceeds the absolute value of the body velocity, and b) whether the body and the wheel are both moving in the same direction. The values for the velocities of the wheel and body may be readily determined by integration of the acceleration signals, through means well known in the art, such as, for example, numerical integration via a microprocessor, or analog integration through the familiar circuit of a resistor and an amplifier connected in series, with a feedback capacitor connected across the amplifier.

If both conditions 8) and 9) are met, then the intermediate signal $I_1$ is set to 0 and is not subtracted from the reference signal $I_0$ in determining the final damping control signal I. Since, in a preferred embodiment, the rigidity (or degree of stiffness) of the damping apparatus varies inversely with respect to the control signal I, satisfaction of both relationships 8) and 9) and of a corresponding setting of $I_1$ to 0 results in the setting of a relatively softer damping characteristic.

Figure 5:
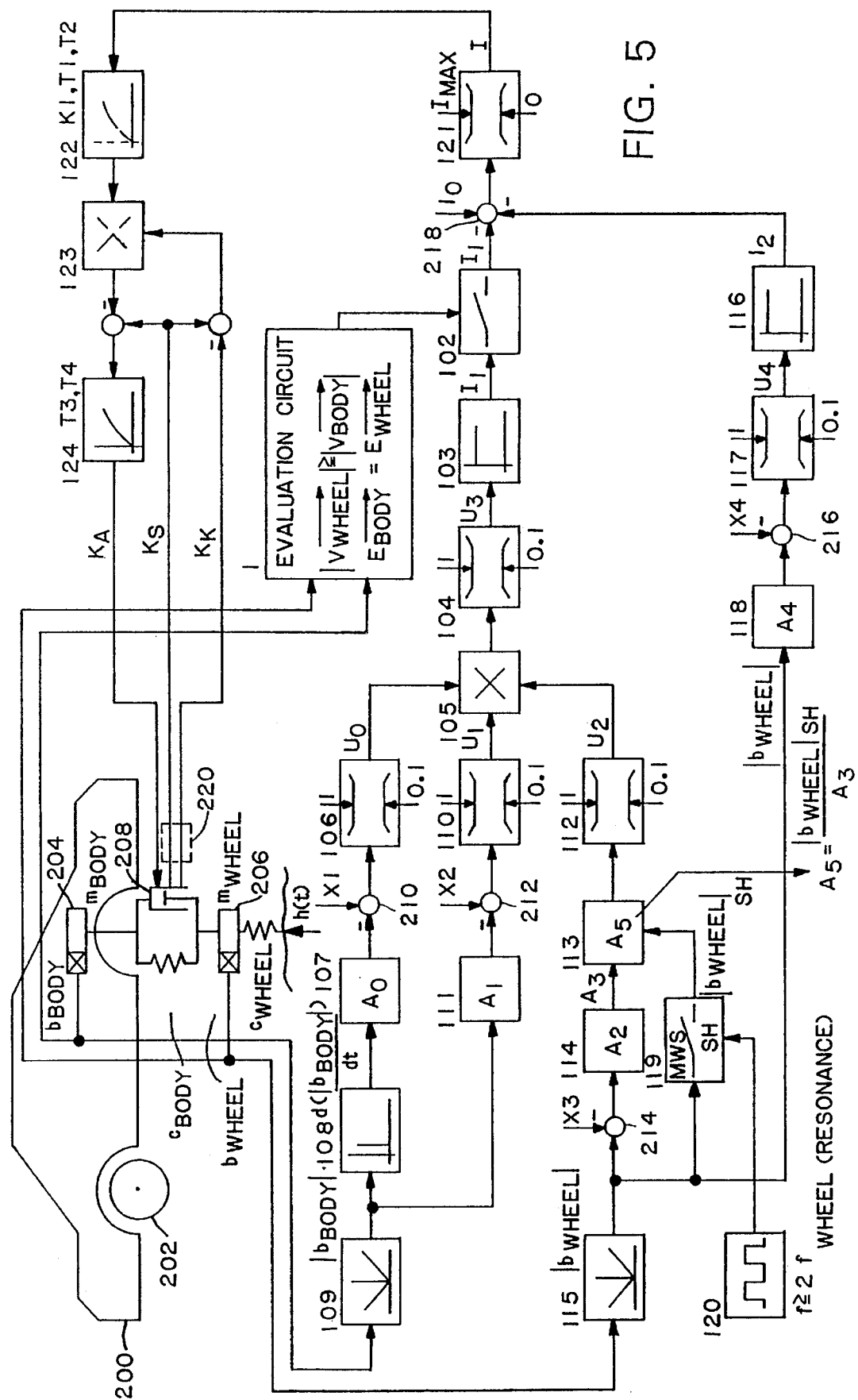
FIG. 5 schematically illustrates an apparatus for the control of a two mass system.

FIG. 5 is another schematic depiction of an example where the present invention may be utilized, wherein the various processing of signals set forth in equations 1)–9) above and illustrated algorithmically in FIG. 4 is preferably carried out, at least in part, using analog components and analog signals, such as, for example, current voltage, etc. Of course, it will be readily appreciated by one of ordinary skill in the art that the example, as shown in FIG. 5, can be equally well carried out employing other equivalent technology, such as, for example, digital processing techniques.

Referring again to FIG. 5, a vehicle equipped with the examples which may employ the present invention has a vehicle body 200 having a mass $m_{body}$ and a vehicle wheel 202 having a mass $m_{wheel}$. The interaction of the vehicle body and vehicle wheel with one another through a vibration damping apparatus having variable damping characteristics 208 is approached by considering the vehicle body to have a spring constant of $c_{body}$ and the wheel to have a spring constant of $c_{wheel}$. Two sensors (e.g., accelerometers) 204 and 206 generate vector acceleration signals $b_{body}$ and $b_{wheel}$ representative of both the direction and the magnitude of the accelerations of the body and wheel, respectively. Such acceleration signals are generated in response to the interaction of the vehicle body and wheel with an uneven road surface depicted generally as a function h(t). The vehicle body acceleration signal $b_{body}$ is processed according to equation 1) above to generate an intermediate signal $U_0$ via an absolute value generator 109, a differentiator 108, a coefficient multiplier 107, a summation (or subtraction) element 210 and a limiting circuit 106.

Substantially in parallel, an intermediate signal $U_1$ is generated via a coefficient multiplier 111, a summation (or subtraction) element 212 and another limiting circuit 110. The wheel acceleration $b_{wheel}$ sensed by accelerometer 206 is processed according to equation 3) set forth above to produce the intermediate signal $U_2$ via an absolute value generator 115, a summation (or subtraction) element 214, a coefficient multiplier 114, a coefficient multiplier 113 and a still further limiting circuit 112. The coefficient $A_5$ employed in coefficient multiplier 113 is, in turn, derived according to equation 5) above as a function of the wheel acceleration produced by a sample and hold circuit 119, which is driven at a sampling frequency f which is at least equal to or greater than twice the resonant frequency of the wheel $f_{wheel}$ (resonance). Sample and hold circuit 119 may preferably incorporate memory circuitry and comparitor circuitry for maintaining in memory the greatest wheel acceleration produced over an appropriately chosen period of time.

The three generated intermediate signals $U_0$, $U_1$ and $U_2$ are all multiplied together in a multiplier element 105, and the resulting product is limited in limiting circuitry 104, such that, preferably, its value ranges between about 0.1 and about 1.0. The thus limited product signal, designated in FIG. 5 as $U_3$, is then introduced into a proportional current generating circuit 103. For example, intermediate signal $U_3$ could be a voltage representative signal, and current generating element 103 could be a voltage controlled current source, e.g., a transistor circuit well known in the art which generates a proportionately representative current signal $I_1$ in response thereto.

The absolute value of the wheel acceleration produced by absolute value generator 115 is also further processed, substantially in parallel, to produce a second intermediate current signal $I_2$, according to equation 4) above, via coefficient multiplier 118, summation (or subtraction) element 216, limiting circuitry 117 and an additional voltage controlled proportional current source 116.

A constant reference current $I_0$ is introduced into addition (or subtraction) element 218, wherein signal 12 is subtracted from reference signal $I_0$ to partially produce the vibration damper control signal I.

In Evaluation Circuit 1, discussed more fully in connection with FIG. 6, the body and wheel accelerations are integrated to yield the body and wheel velocities $V_{body}$ and $V_{wheel}$, respectively. Testing is then, conducted to determine whether both of the following conditions are met: a) whether the wheel velocity exceeds or at least equals the body velocity, and b) whether the directions of the two velocities are identical. If both of these conditions are met, then the value of the intermediate signal $I_1$ is set to 0. In other words, in such a case, the constant reference signal $I_0$ is not further reduced by the value of the intermediate signal $I_1$. Otherwise, if both of the above conditions are not met, the value of the intermediate signal $I_1$ is set to its actual processed value, and the value of the constant reference signal 10 is further reduced by this processed value $I_1$ in addition (or subtraction) element 218.

The value of the calculated control signal I is appropriately limited in a still further limitation circuit 121 between maximum and minimum values $I_{max}$ and 0, appropriately set according to the range of possible adjustment of the vibration damping apparatus being employed.

As noted above, the vibration damping apparatus 208 preferably, exhibits a variable damping characteristic, preferably in response to a variable control current signal I. One possible such variable damping apparatus is disclosed in U.S. Pat. No. 4,749,069, issued Jun. 7, 1988 to Knecht, et al. and entitled "Vibration Damper for Motor Vehicles having an Arrangement for Varying Damping Thereof", patent is hereby expressly incorporated by reference with the same effect as if the entire contents thereof were expressly set forth herein.

Even more preferably, the vibration damping apparatus 208 will have a damping characteristic which is variable between a relatively stiff damping characteristic $K_S$ and a relatively soft damping characteristic $K_K$. Additionally, in an even more preferred embodiment, the vibration damping apparatus 208 includes means for setting, either manually or otherwise, the damping characteristic limits $K_S$ and $K_K$. Still further, in a particularly preferred embodiment, the vibration damping apparatus 208 includes circuitry (e.g., limit indicators and a potentiometer) 220 which generates signals representative of the currently set damping characteristic limits $K_S$ and $K_K$.

The damping force characteristic $K_A$ actually applied by vibration damping apparatus 208 is, therefore, in general, a function of $K_S$, $K_K$ and I. Moreover, the damping force characteristics need not be absolutely linear functions, but may be nonlinear and may vary additionally with respect to time, etc. In general, the actual applied damping force characteristic $K_A$ will be a member of the general family of characteristics represented as:

$$K_A = K_S - (K_S - K_K) \times K_1 \times I$$

In FIG. 5, this general family of damping characteristics is schematically represented by a proportional conversion element 122, which includes time delay means dependent upon T1 and T2, multiplication circuitry 123 and a proportional conversion element 124, incorporating time delay means dependent upon T3 and T4.

Dependent upon the control current I, the damping characteristic limit signals $K_S$ and $K_K$ provided by limit indication means 220, and appropriately determined parameters K1, T1, T2, T3, and T4, the damping characteristics of vibration damping apparatus 208 are, therefore, appropriately set between the applicable limits.

Referring again to FIG. 5, there, the wheel suspension of a vehicle wheel of a vehicle is simulated by means of a two mass system. The weight of the vehicle body is represented by $m_{body}$, the wheel mass by $m_{wheel}$, the spring constant of the vehicle body by $c_{body}$ and the spring constant of the vehicle wheel by $c_{wheel}$. The unevenness of the road is designated h(t). The vibration damper is described by the damping force constant $K_A$, which is, in turn, influenced by the valve control current I.

In the Evaluation Circuit 1, a switching criterion is derived to activate the analog circuit 102. The vehicle always runs on the lowest damping force characteristic, if the following conditions are fulfilled: 1) the velocity of the wheel is greater than the velocity of the vehicle body, and 2) the direction of the unit vectors of the wheel and of the body are identical. For this purpose, the wheel acceleration and the vehicle body acceleration are determined by sensors, and processed by the Evaluation Circuit 1, shown in greater detail in FIG. 6. In practice, to fulfill these conditions, a critical value circuit and a hysteresis (or memory circuit) may be permitted. If the criterion is fulfilled, switch circuit 2 is opened, such that the current $I_1$ equals zero, and the valve current is determined only by the current $I_0$ and by the current $I_2$.

If the switching criterion is not fulfilled, the damping force is continuously set by the control circuit $I_1$. This control circuit $I_1$ is formed by the multiplication of the voltages $U_0$, $U_1$ and $U_2$ in the multiplier 105 and the voltage current transformation in the proportional element 103. For example, a voltage controlled current source, such as a transistor circuit, well known in the art, could be utilized for proportional element 103. The limiters 104, 106, 110, 112 and 117 limit the output voltages to within a defined range. For example, this range in FIG. 4 is shown normalized to between 0.1 and 1. $U_0$ is calculated from the absolute value of the vehicle body acceleration 109, the differentiator 108, the coefficient multiplier 111 and the constant $X_1$. $U_1$ is calculated from the absolute value of the vehicle body acceleration 109, the coefficient multiplier 107 and the constant $X_2$.

The influence of the roadway is taken into consideration by the vehicle wheel acceleration in the coefficient divider 113, the coefficient multiplier 114, the constant $X_3$, the absolute value generation of the vehicle wheel acceleration 115, the maximum value memory 119 and the frequency generator 120.

Since the damping force characteristics do not, as a rule, follow a linear path, there are different comfort actions for different roadway profiles. This influence can be corrected by means of the coefficient divider 113, the maximum value memory 119 and the frequency generator 120. In the additional sample and hold circuit 119, the maximum wheel acceleration for the half-period of the wheel resonant frequency is buffered, and transmitted to the coefficient divider 113 to correct the control voltage $U_2$.

The safety of the vehicle is determined, among other things, by the dynamic wheel load fluctuations. Severe wheel accelerations caused by the roadway also increase the wheel load fluctuations. In the proportional element 116, from the limiter 117, the constant $X_4$, and the coefficient multiplier 118 and the absolute value of the vehicle wheel acceleration 115, therefore, a control current $I_2$ is calculated, which continuously increases the damping force with increasing wheel acceleration.

For the realization of the control apparatus, an adjustment valve is necessary, which produces a proportional action between the hardest damping force characteristic $K_S$ and the minimum valve current, e.g. I=0, and the softest damping force characteristic $K_K$ and the maximum valve current $I_{max}$. The damping force characteristics need not be linear. For example, the damping force constant $K_A$ for any random point in the family of characteristics can be calculated from:

$$K_A = K_S - (K_S - K_K) \times K_1 \times I.$$

The damping force constant of the vehicle body $K_A$ is proportional to the control current I, whose amplitude can be limited in the limiter 121 to a desired range, e.g., between about 0 and about $I_{max}$. The regulation of the adjustment valve is described in the proportional element with a delay 122 by $K_1$, $T_1$ and $T_2$. The temporal action of a vibration damper is taken into consideration in an additional proportional element with delay 124 by $T_3$ and $T_4$.

Figure 7:
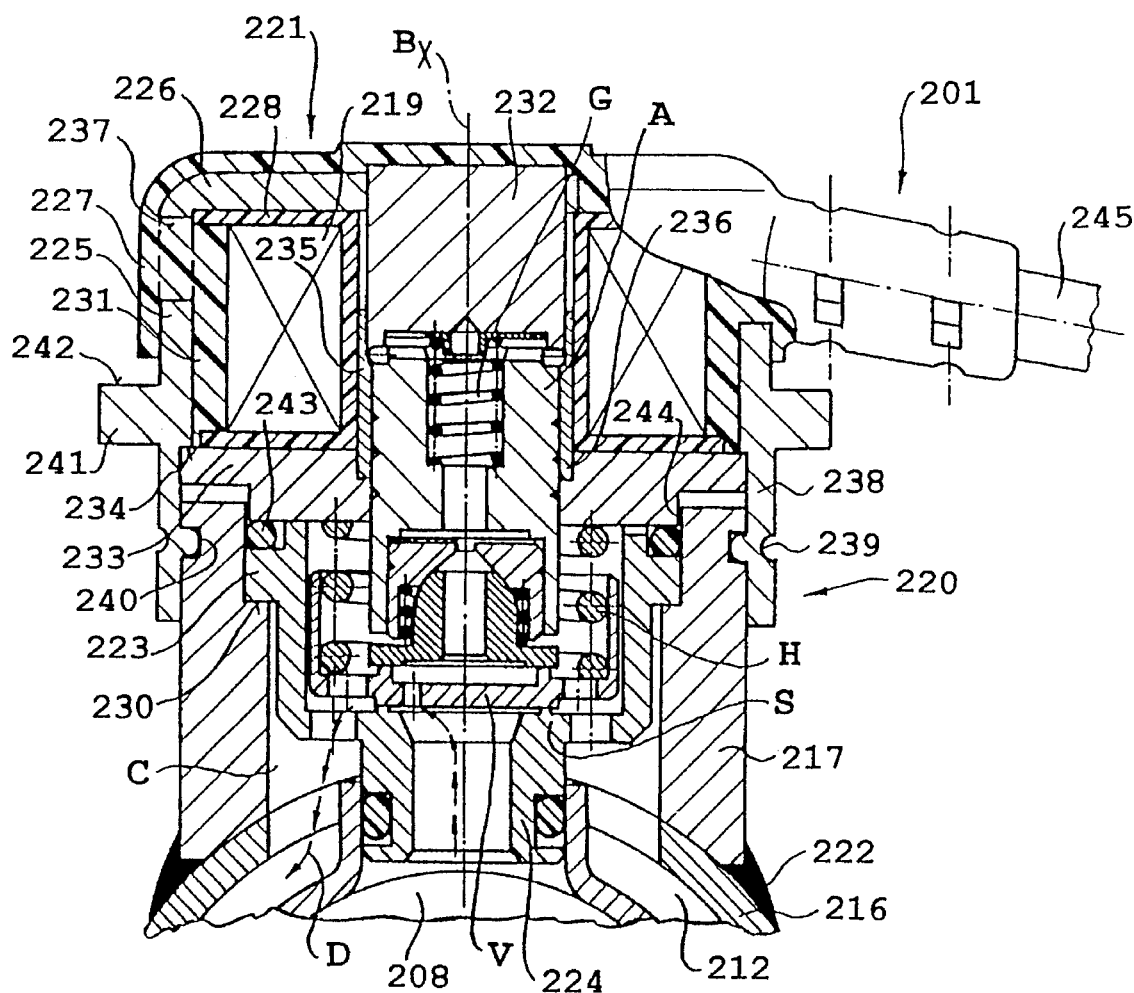

FIGS. 6 and 7 show a typical shock absorber or vibration damper in which the embodiments of the present invention may conceivably be incorporated. It should be understood that the components found hereinbelow are interchangable with the components discussed hereinabove with reference to FIGS. 1 through 5.

FIG. 6 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 11, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 7 one can again see the fluid path 208 and the compensating chamber 212, which are interconnectable through the valve unit 201. The fluid path 208 is connected to the upper working chamber 211 as shown in FIG. 6. The flow direction from the fluid path 208 to the compensating chamber 212 across the valve unit 201 is indicated in FIG. 7 by the dotted line D provided with arrows indicating the flow direction both for inward movement and outward movement of the piston rod 204 with respect to the pressure pipe 202. One can see in FIG. 7 a valve member V which can be lifted with respect to a valve seat S, such as to open the flow path D from the fluid path 208 to the compensating chamber 212.

For explaining the principles of the embodiment of the present invention shown in FIGS. 6 and 7, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 7 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

One feature of the invention resides broadly in the process for the recognition of cornering for a vehicle with an active hydraulic system to adjust components to alter the ride of the vehicle, comprising a supply pump for the hydraulic system, a number of valves for control of the actuators and a measuring device for determination of vehicle movement parameters, whereby a vehicle acceleration signal $a_1$ is measured, the vehicle acceleration signal a is compared to an acceleration threshold value $a_s$, a vehicle velocity signal v is compared to a lower vehicle velocity threshold value $v_u$, a vehicle velocity signal v is compared to an upper vehicle velocity threshold value $v_o$, a steering movement is detected as a steering angle below and above a steering angle threshold value $s_{delta}$ and recognized as such, at a vehicle velocity in the vehicle velocity range between the vehicle velocity threshold values $v_u$ and $v_o$, the power supply of the actuators is actuated only if actual acceleration simultaneously increases above the acceleration threshold value $a_s$.

Another feature of the invention resides broadly in the process characterized by the fact that for a velocity range with a vehicle velocity signal v greater then $v_o$, the actuators are supplied as function of the vehicle acceleration signal a without consideration of the steering angle threshold value.

Yet another feature of the invention resides broadly in the process characterized by the fact that when the power supply to the actuators is actuated, the actual values must drop below a vehicle acceleration threshold value $a_h$ which is smaller than the vehicle acceleration threshold value $a_s$ to deactuate the power supply to the actuators when the previous vehicle speed signal v is above $v_o$.

Still another feature of the invention resides broadly in the process characterized by the fact that when the power supply to the actuators is actuated, the actual values must drop below both the steering angle threshold value and the vehicle acceleration threshold value $a_h$, which is smaller than the vehicle acceleration threshold value a when the instantaneous vehicle velocity signal v is between $v_u$ and $v_o$.

A further feature of the invention resides broadly in the process characterized by the fact that when the power supply to the actuators is actuated, the actual values must drop below a lower vehicle acceleration threshold value $v_{ua}$, which is smaller than the vehicle acceleration threshold value $v_u$ when the instantaneous vehicle velocity signal v is below $v_u$.

Another feature of the invention resides broadly in the apparatus for the recognition of cornering for a vehicle with an active hydraulic system to adjust components to alter the ride of the vehicle, consisting of a supply pump for the hydraulic system, a number of valves for control of the actuators and a measuring device for determination of vehicle movement parameters, characterized by the fact that the measuring device consists of at least one sensor which measures vehicle acceleration and one which measures vehicle velocity 1, 3, that a steering angle sensor 5 detects when the steering angle threshold value is exceeded, that the threshold values are stored in a computer memory unit 9.

One embodiment of the invention deals with a process for the recognition of cornering for a vehicle with an active hydraulic system to adjust components to alter the ride of the vehicle, comprising a supply pump for the hydraulic system, a number of valves for control of the actuators and a measuring device for determination of vehicle movement parameters, whereby

- a vehicle acceleration signal a is preferably measured or otherwise determined,
- the vehicle acceleration signal a is operatively compared to an acceleration threshold value $a_s$,
- a vehicle velocity signal v is compared to a lower vehicle velocity threshold value $v_u$,
- a vehicle velocity signal v is compared to an upper vehicle velocity threshold value $v_o$,
- a steering movement is detected as a steering angle below and above a steering angle threshold value $s_{delta}$ and recognized as such so that preferably only a left, or right and no signal are generated
- at a vehicle velocity in the vehicle velocity range between the vehicle velocity threshold values $v_u$ and $v_o$, the power supply or pumps and valves of the actuators are actuated only if actual acceleration simultaneously increases above the acceleration threshold value $a_s$.

Another embodiment of the invention deals with apparatus for the recognition of cornering for a vehicle with an active hydraulic system to adjust components to alter the ride of the vehicle, consisting of a supply pump for the hydraulic system, a number of valves for control of the actuators and a measuring device for determination of vehicle movement parameters, characterized by the fact

- that the measuring device consists of at least one sensor which measures vehicle acceleration and one which measures vehicle velocity (1, 3),
- that a steering angle sensor (5) detects when the steering angle threshold value is exceeded,
- that the threshold values are stored in a computer memory unit (9).

Some examples of systems in which embodiments of the present invention would be used are: U.S. Pat. No. 5,228,719, entitled "Automotive Active Suspension System for Anti-Rolling Control"; U.S. Pat. No. 5,231,583 to Lizell, entitled "Method and Apparatus for Dynamic Leveling of a Vehicle Using an Active Suspension System"; U.S. Pat. No. 5,195,772 to Bachrach, Levitt, and Nametz, entitled "Valve Configuration for Converting an Active Suspension System Into a Passive Suspension System"; U.S. Pat. No. 5,183,127 entitled "Suspension-Traction Total Control System"; U.S. Pat. No. 5,208,749 entitled "Method for Controlling Active Suspension System on the Basis of Rotational Motion Model"; U.S. Pat. No. 5,299,488 to Kadlicko and Halina, entitled "Active Suspension System"; U.S. Pat. No. 5,322,319 entitled "Active Suspension Apparatus for a Vehicle"; U.S. Pat. No. 5,322,321 to Yopp, entitled "Vehicle Active Suspension System"; and 4,700,812 entitled "Vehicular Suspension System," issued to Moser.

Some types of automobile suspension systems that could be utilized in accordance with a rotary actuator motor may be or are disclosed by the following U.S. Pat. Nos.: 5,178,406 to Reynolds, entitled "Torsion Bar Suspension"; 5,286,059 to Tabe, entitled "Height Control System when Vehicle Is Jacked Up"; 5,288,101 to Minnett, entitled "Variable Rate Torsion Control System for Vehicle Suspension"; and 5,290,048 to Takahashi and Yamashita, entitled "Working Fluid Circuit for Active Suspension Control System of Vehicle".

Some other examples of systems that could be used in conjunction with the present invention may be or are disclosed by the following U.S. Pat. Nos.: 5,251,728 to Mund et al., entitled "Hydraulic Vibration Damper or Shock Absorber with Electrical Connector Therefor"; 4,785,920 to Knecht et al., entitled "Hydraulic Adjustable Shock Absorber"; 4,719,800 to Moser, entitled "Accelerometer"; 4,989,148 to Gürke et al., entitled "Apparatus for the Computer-Assisted Control of Vibration Dampers of a Vehicular Suspension System as a Function of the Roadway"; 4,749,070 to Moser et al., entitled "Hydraulic Vibration Damper Having Adjustable Damping Valve".

In an embodiment with an instantaneous vehicle velocity signal v below $v_u$, actual values must drop below the vehicle acceleration threshold value a, the steering angle threshold value and also a lower vehicle velocity threshold value $v_{ua}$, which is smaller than the vehicle velocity value $v_u$.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 37 772.6, filed on Nov. 5, 1993, having inventor Jörg Büngeler, and DE-OS P 43 37 772.6 and DE-PS P 43 32 772.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A suspension system assembly comprising:
   at least one shock absorber, said at least one shock absorber comprising:
   a sealed cylinder defining a chamber therein, said cylinder containing a damping fluid; said cylinder having a first end and a second end;
   a piston rod sealingly projecting into said cylinder and being axially displaceable with respect to said cylinder;
   said first end of said cylinder being disposed at said piston rod;
   a piston being attached to said piston rod, said piston being slidably disposed within said cylinder to sealingly divide said chamber into first and second chambers;

means for permitting flow of damping fluid between said first and second chambers;

said cylinder having an inner wall disposed towards said piston rod and an outer wall disposed radially away from said piston rod;

a central longitudinal axis defined through said sealed cylinder, the central longitudinal axis defining a longitudinal direction of said shock absorber;

means for the recognition of cornering for a vehicle with an active hydraulic system;

said means for the recognition of cornering for a vehicle with an active hydraulic system comprising a supply pump for the hydraulic system, a plurality of actuators, a number of valves for control of the actuators and a measuring device for determination of vehicle movement parameters;

said means for the recognition of cornering for a vehicle with an active hydraulic system further comprising:

means for measuring a vehicle acceleration signal "a";

means for providing an acceleration threshold value "$a_s$";

means for comparing said vehicle acceleration signal "a" to said acceleration threshold value "$a_s$";

means for measuring a vehicle velocity signal "v";

means for providing a lower vehicle velocity threshold value "$v_u$";

means for comparing said vehicle velocity signal "v" to a lower vehicle velocity threshold value "$v_u$";

means for providing an upper vehicle velocity threshold value "$v_o$"

means for comparing said vehicle velocity signal "v" to said upper vehicle velocity threshold value "$v_o$";

means for providing a steering angle threshold value "$s_{delta}$";

means for detecting a steering movement as a steering angle;

said means for detecting a steering movement as a steering angle comprising means for detecting said steering angle below and above said steering angle threshold value "$s_{delta}$";

means for actuating power to the suspension system;

said means for actuating power to the suspension system comprising means for providing a signal to said valves for control of the actuators;

said means for providing a signal to said valves for control of the actuators comprising means for providing a signal to said valves at a vehicle velocity in the vehicle velocity range between the vehicle velocity threshold values "$v_u$" and "$v_o$";

said means for providing a signal to said valves at a vehicle velocity in the vehicle velocity range between the vehicle velocity threshold values "$v_u$" and "$v_o$" comprising means for providing a signal to said valves only if the actual measured acceleration "a" increases above the acceleration threshold value "$a_s$" at the same time as the vehicle velocity is in the vehicle velocity range between the vehicle velocity threshold values "$v_u$" and "$v_o$";

a spring for applying a substantially longitudinally directed force with said shock absorber;

said spring being operatively connected to apply the force to said shock absorber.

2. Apparatus according to claim 1, wherein:

said means for the recognition of cornering comprises:

means for comparing said vehicle velocity signal "v" to said upper vehicle velocity threshold "$v_o$";

said means for comparing said vehicle velocity signal "v" to said upper vehicle velocity threshold "$v_o$" comprises means for determining when said vehicle velocity signal "v" is greater than "$v_o$";

means for determining a steering angle of the vehicle, means for providing a signal for actuating power to the suspension system relating to the vehicle acceleration signal "a" without consideration of the steering angle threshold value "$s_{delta}$".

3. Apparatus according to claim 2 wherein:

means for providing a yet lower vehicle acceleration threshold value "$a_h$";

said yet lower vehicle acceleration threshold value $a_h$ being an acceleration less than said vehicle acceleration value "$a_s$";

means for deactivating the actuators;

said means for deactivating the actuators comprising:

means for sensing the previous vehicle speed signal "v" being above "$v_o$" and for sensing the actual value of vehicle acceleration being below the yet lower vehicle acceleration threshold value "$a_h$"; and means for deactivating the actuators upon said sensing means sensing the previous vehicle speed signal "v" as being above "v" and the actual value of vehicle acceleration as being below the yet lower vehicle acceleration threshold value "$a_h$".

4. Apparatus according to claim 1 including:

means for providing a yet lower vehicle acceleration threshold value "$a_h$";

said yet lower vehicle acceleration threshold value "$a_h$" being smaller than the vehicle acceleration threshold value "$a_s$";

means for determining when the acceleration "a" is below the yet lower vehicle acceleration threshold value "$a_h$" and the steering angle is below the steering angle threshold value "$s_{delta}$";

means for actuating the actuators upon said determining means determining that the acceleration "a" is below the yet lower vehicle acceleration threshold value "$a_h$" and the steering angle is below the steering angle threshold value "$s_{delta}$";

said means for determining indicating a signal that both the steering angle is below the steering angle threshold value and the vehicle acceleration value is below the yet lower vehicle acceleration threshold value "$a_h$" upon the instantaneous vehicle velocity signal "v" being below the lower vehicle velocity threshold value "$v_u$" and the upper vehicle velocity threshold value "$v_o$".

5. Apparatus according to claim 1, including;

means for providing a yet lower vehicle velocity threshold value "$v_{ua}$";

said yet lower vehicle velocity threshold value "$v_{ua}$" is smaller than the vehicle velocity threshold value "$v_u$";

means for actuating the actuators when the value of the vehicle velocity "$v_o$" has dropped below said yet lower vehicle velocity threshold value "$v_v$" and the instantaneous vehicle velocity signal "v" is below the lower vehicle velocity threshold value "$v_u$".

6. A suspension system comprising means for the recognition of cornering for a vehicle with an active hydraulic system;

said means for the recognition of cornering for a vehicle with an active hydraulic system comprising a supply pump for the hydraulic system, a plurality of actuators, a number of valves for control of the actuators and a measuring device for determination of vehicle movement parameters, said means for the recognition of cornering for a vehicle with an active hydraulic system further comprising:
means for measuring a vehicle acceleration signal "a";
means for providing an acceleration threshold value "$a_s$";
means for comparing said vehicle acceleration signal "a" to said acceleration threshold value "$a_s$";
means for measuring a vehicle velocity signal "v";
means for providing a lower vehicle velocity threshold value "$v_u$";
means for comparing said vehicle velocity signal "v" to a lower vehicle velocity threshold value "$v_u$";
means for providing an upper vehicle velocity threshold value "$v_o$"
means for comparing said vehicle velocity signal "v" to said upper vehicle velocity threshold value "$v_o$";
means for providing a steering angle threshold value "$s_{delta}$";
means for detecting a steering movement as a steering angle;
said means for detecting a steering movement as a steering angle comprising means for detecting said steering angle below and above said steering angle threshold value "$s_{delta}$";
means for actuating power to the suspension system;
said means for detecting a steering movement as a steering angle comprising means for detecting said steering angle below and above said steering angle threshold value "$s_{delta}$";
means for actuating power to the suspension system;
said means for actuating power to the suspension system comprising means for providing a signal to said valves for control of the actuators;
said means for providing a signal to said valves for control of the actuators comprising means for providing a signal to said valves at a vehicle velocity in the vehicle velocity range between the vehicle velocity threshold values "$v_u$" and "$v_o$";
said means for providing a signal to said valves at a vehicle velocity in the vehicle velocity range between the vehicle velocity threshold values "$v_u$" and "$v_o$" comprising means for providing a signal to said valves only if the actual measured acceleration "a" increases above the acceleration threshold value "$a_s$" at the same time as the vehicle velocity is in the vehicle velocity range between the vehicle velocity threshold values "$v_u$" and "$v_o$";
a spring for applying a substantially longitudinally directed force with said shock absorber;
said spring being operatively connected to apply the force to said shock absorber.

7. The suspension system according to claim 6, wherein:
said means for the recognition of cornering comprises:
means for comparing said vehicle velocity signal "v" to said upper vehicle velocity threshold "$v_o$";
said means for comparing said vehicle velocity signal "v" to said upper vehicle velocity threshold "$v_o$" comprises means for determining when said vehicle velocity signal "v" is greater than "$v_o$";
means for determining a steering angle of the vehicle;
means for providing a signal for actuating power to the suspension system relating to the vehicle acceleration signal "a" without consideration of the steering angle threshold value "$s_{delta}$".

8. The suspension system according to claim 7 wherein:
means for providing a yet lower vehicle acceleration threshold value "$a_h$";
said yet lower vehicle acceleration threshold value $a_h$ being an acceleration less than said vehicle acceleration value "$a_s$";
means for deactivating the actuators;
said means for deactivating the actuators comprising:
means for sensing the previous vehicle speed signal "v" being above "$v_o$" and for sensing the actual value of vehicle acceleration being below the yet lower vehicle acceleration threshold value "$a_h$"; and
means for deactivating the actuators upon said sensing means sensing the previous vehicle speed signal "v" as being above "$v_o$" and the actual value of vehicle acceleration as being below the yet lower vehicle acceleration threshold value "$a_h$".

9. The suspension system according to claim 6 including:
means for providing a yet lower vehicle acceleration threshold value "$a_h$";
said yet lower vehicle acceleration threshold value "$a_h$" being smaller than the vehicle acceleration threshold value "$a_s$";
means for determining when the acceleration "a⇆ is below the yet lower vehicle acceleration threshold value "$a_h$" and the steering angle is below the steering angle threshold value "$s_{delta}$";
means for actuating the actuators upon said determining means determining that the acceleration "a" is below the yet lower vehicle acceleration threshold value "$a_h$" and the steering angle is below the steering angle threshold value "$s_{delta}$";
said means for determining indicating a signal that both the steering angle is below the steering angle threshold value and the vehicle acceleration value is below the yet lower vehicle acceleration threshold value "$a_h$" upon the instantaneous vehicle velocity signal "v" being below the lower vehicle velocity threshold value "$v_u$" and the upper vehicle velocity threshold value "$v_o$".

10. The suspension system according to claim 6, including:
means for providing a yet lower vehicle velocity threshold value "$v_{ua}$";
said yet lower vehicle velocity threshold value "$v_{ua}$" is smaller than the vehicle velocity threshold value "$v_u$";
means for actuating the actuators when the value of the vehicle velocity "$v_o$" has dropped below said yet lower vehicle velocity threshold value "$v_u$" and the instantaneous vehicle velocity signal "v" is below the lower vehicle velocity threshold value "$v_u$".

11. Method of operating an active suspension system in a vehicle with an active hydraulic system comprising a supply pump for the hydraulic system, a plurality of actuators, a number of valves for control of the actuators and a measuring device for determination of vehicle movement parameters, said method comprising:
providing an acceleration threshold value "$a_s$";
providing a lower vehicle velocity threshold value "$v_u$";
providing an upper vehicle velocity threshold value "$v_o$";
providing a steering angle threshold value "$s_{delta}$";
measuring a vehicle acceleration signal "a";
comparing said vehicle acceleration signal "a" to said acceleration threshold value "$a_s$";

measuring a vehicle velocity signal "v";

comparing said vehicle velocity signal "v" to a lower vehicle velocity threshold value "$v_u$";

comparing said vehicle velocity signal "v" to said upper vehicle velocity threshold value "$v_o$";

detecting a steering movement as a steering angle below and above said steering angle threshold value "$s_{delta}$";

actuating power to the suspension system, by a signal to said valves for control of the actuators, at a vehicle velocity in the vehicle velocity range between the vehicle velocity threshold values "$v_u$" and "$v_o$", and actuating the actuators only if actual measured acceleration "a" simultaneously increases above the acceleration threshold value "$a_s$".

12. Method according to claim 11, including:

recognizing cornering by said means for the recognition of cornering comprising:

comparing, by means for comparing, said vehicle velocity signal "v" to said upper vehicle velocity threshold "$v_o$";

said means for comparing said vehicle velocity signal "v" to said upper vehicle velocity threshold "$v_o$" comprises means for determining when said vehicle velocity signal "v" is greater than "$v_o$";

determining, by means for determining, a steering angle of the vehicle;

providing a signal, by means for providing a signal, for actuating power to the suspension system relating to the vehicle acceleration signal "a" without consideration of the steering angle threshold value "$s_{delta}$".

13. Method according to claim 12 wherein:

providing, by means for providing, a yet lower vehicle acceleration threshold value "$a_h$";

said yet lower vehicle acceleration threshold value $a_h$ being an acceleration less than said vehicle acceleration value "$a_s$";

deactivating the actuators, by means for deactivating the actuators;

said deactivating the actuators comprising:

sensing, by means for sensing, the previous vehicle speed signal "v" being above "$v_o$" and sensing, by means for sensing, the actual value of vehicle acceleration being below the yet lower vehicle acceleration threshold value "$a_h$"; and deactivating the actuators, by means for deactivating the actuators, upon said sensing means sensing the previous vehicle speed signal "v" as being above "$v_o$" and the actual value of vehicle acceleration as being below the yet lower vehicle acceleration threshold value "$a_h$".

14. Method according to claim 11 including:

providing, by means for providing, a yet lower vehicle acceleration threshold value "$a_h$";

said yet lower vehicle acceleration threshold value "$a_h$" being smaller than the vehicle acceleration threshold value "$a_s$";

determining, by means for determining, when the acceleration "a" is below the yet lower vehicle acceleration threshold value "$a_h$" and the steering angle is below the steering angle threshold value "$s_{delta}$";

actuating the actuators, by means for actuating the actuators upon said determining means determining that the acceleration "a" is below the yet lower vehicle acceleration threshold value "$a_h$" and the steering angle is below the steering angle threshold value "$s_{delta}$";

indicating a signal, by said means for determining, that both the steering angle is below the steering angle threshold value and the vehicle acceleration value is below the yet lower vehicle acceleration threshold value "$a_h$" upon the instantaneous vehicle velocity signal "v" being below the lower vehicle velocity threshold value "$v_u$" and the upper vehicle velocity threshold value "$v_o$".

15. Method according to claim 11, including:

providing, by means for providing a yet lower vehicle velocity threshold value "$v_{ua}$";

said yet lower vehicle velocity threshold value "$v_{ua}$" is smaller than the vehicle velocity threshold value "$v_u$";

actuating the actuators, by means for actuating the actuators, when the value of the vehicle velocity "$v_o$" has dropped below said yet lower vehicle velocity threshold value "$v_u$" and the instantaneous vehicle velocity signal "v" is below the lower vehicle velocity threshold value "$v_u$".

* * * * *

UNITED STATES PATENT AND TRADEMARK OFFICE
CERTIFICATE OF CORRECTION

PATENT NO. : 5,481,459

DATED : January 2, 1996

INVENTOR(S) : Jörg BÜNGELER

Page 1 of 2

It is certified that error appears in the above-indentified patent and that said Letters Patent is hereby corrected as shown below:

In column 1, lines 49-50, after 'Consequently,' insert --the system can react very quickly. The use of a lower vehicle--.

In column 1, lines 51-52, after 'into' delete "the system can react very quickly. The use of a lower vehicle".

In column 1, line 65, after 'to' insert --this velocity range must be dissolved. The upper vehicle--.

In column 1, line 66, after the first occurrence of 'the' delete "this velocity range must be dissolved. The upper".

In column 2, line 16, after 'value', delete "$v_a$." and insert --$v_u$.--.

In column 4, after line 3, beginning with a new line, insert --ON--.

In column 4, line 11, after 'OFF', since the second table has been omitted, begin a new line by inserting the following table heading:
--Velocity Acceleration Steering Angle Power Supply
v         α              on 1/off 0     on 1/off 0--

In column 9, line 2, after 'signal', delete "12" and insert --$I_2$--.

UNITED STATES PATENT AND TRADEMARK OFFICE
CERTIFICATE OF CORRECTION

PATENT NO. : 5,481,459
DATED : January 2, 1996
INVENTOR(S) : Jörg BÜNGELER

It is certified that error appears in the above-indentified patent and that said Letters Patent is hereby corrected as shown below:

In column 9, line 18, after 'signal', delete "10" and insert --$I_0$--.

In column 14, line 53, after 'value', delete "a" and insert --$a_s$--.

In column 18, line 26, Claim 3, after 'above', delete " "v" " and insert --"$v_o$"--.

In column 18, line 59, Claim 5, after 'value', delete " "$v_v$" " and insert --"$v_u$"--.

In column 20, line 25, Claim 9, after 'acceleration', delete " "$a_\leftarrow^\rightarrow$" " and insert --"a"--.

In column 22, line 6, Claim 14, after 'value', delete " "$a_s$; " and insert --"$a_s$";--.

Signed and Sealed this

Seventh Day of January, 1997

Attest:

BRUCE LEHMAN

*Attesting Officer*     *Commissioner of Patents and Trademarks*